(12) United States Patent
Ferreira

(10) Patent No.: US 12,388,662 B2
(45) Date of Patent: Aug. 12, 2025

(54) AUTOMATED SECURITY CERTIFICATE TECHNIQUES

(71) Applicant: Dell Products L.P., Round Rock, TX (US)

(72) Inventor: João Henrique Paiva Ferreira, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 18/142,316

(22) Filed: May 2, 2023

(65) Prior Publication Data
US 2024/0372734 A1    Nov. 7, 2024

(51) Int. Cl.
*H04L 29/06* (2006.01)
*H04L 9/32* (2006.01)
*H04L 9/40* (2022.01)

(52) U.S. Cl.
CPC ........ *H04L 9/3268* (2013.01); *H04L 63/0428* (2013.01)

(58) Field of Classification Search
None
See application file for complete search history.

(56) References Cited

U.S. PATENT DOCUMENTS

2020/0186502 A1* 6/2020 Suresh ................ H04L 63/0428

FOREIGN PATENT DOCUMENTS

CN    104137511 A  * 11/2014  .......... H04L 63/205

OTHER PUBLICATIONS

What Is An SSL/TLS Certificate?, Amazon Web Services Inc., available at: https://aws.amazon.com/what-is/ssl-certificate/#:~:text=An%20SSL%2FTLS%20certificate%20is,(SSL%2FTLS)%20protocol., last accessed May 2, 2023.
What is a TLS handshake?, Cloudflare, Inc., available at: https://www.cloudflare.com/learning/ssl/what-happens-in-a-tls-handshake/, last accessed May 2, 2023.

* cited by examiner

*Primary Examiner* — Andrew J Steinle
(74) *Attorney, Agent, or Firm* — Ryan, Mason & Lewis, LLP

(57) ABSTRACT

Methods, apparatus, and processor-readable storage media for automated security certificate techniques are provided herein. An example computer-implemented method includes performing a first handshake process between a client device and at least one server for establishing encrypted communication; obtaining an error message associated with the first handshake process; in response to obtaining the error message, collecting one or more public certificates from the at least one server; storing the one or more public certificates in a local keystore of the client device; and performing a second handshake process between the client device and the at least one server, wherein the second handshake process is based at least in part on at least one of the one or more public certificates stored in the local keystore.

20 Claims, 6 Drawing Sheets

AUTOMATED SECURITY CERTIFICATE TECHNIQUES

FIELD

The field relates generally to information processing systems, and more particularly to the processing of security certificates related to such systems.

BACKGROUND

A security certificate is a digital certificate that authenticates the identity of a website and enables an encrypted connection. One example of a security certificate is a Secure Sockets Layer (SSL) certificate, which is used by the Hypertext Transfer Protocol Secure (HTTPS) protocol to create an encrypted link between a web server and a web browser.

SUMMARY

Illustrative embodiments of the disclosure provide automated security certificate techniques. An exemplary computer-implemented method includes performing a first handshake process between a client device and at least one server for establishing encrypted communication; obtaining an error message associated with the first handshake process; in response to obtaining the error message, collecting one or more public certificates from the at least one server; storing the one or more public certificates in a local keystore of the client device; and performing a second handshake process between the client device and the at least one server, wherein the second handshake process is based at least in part on at least one of the one or more public certificates stored in the local keystore.

Illustrative embodiments can provide significant advantages relative to conventional security certificate processing techniques. For example, technical problems associated with complexity and/or potential security issues related to such security certificates are mitigated in one or more embodiments by identifying when a client application establishing an encrypted communication with at least one server encounters an error message (e.g., indicating that one or more new security certificates are needed and/or one or more existing security certificates need to be renewed), and automatically creating and/or renewing one or more security certificates to address the error message. At least some embodiments can create and/or renew the one or more security certificates without having to rely on operating system changes or software that is external to the client device, for example.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
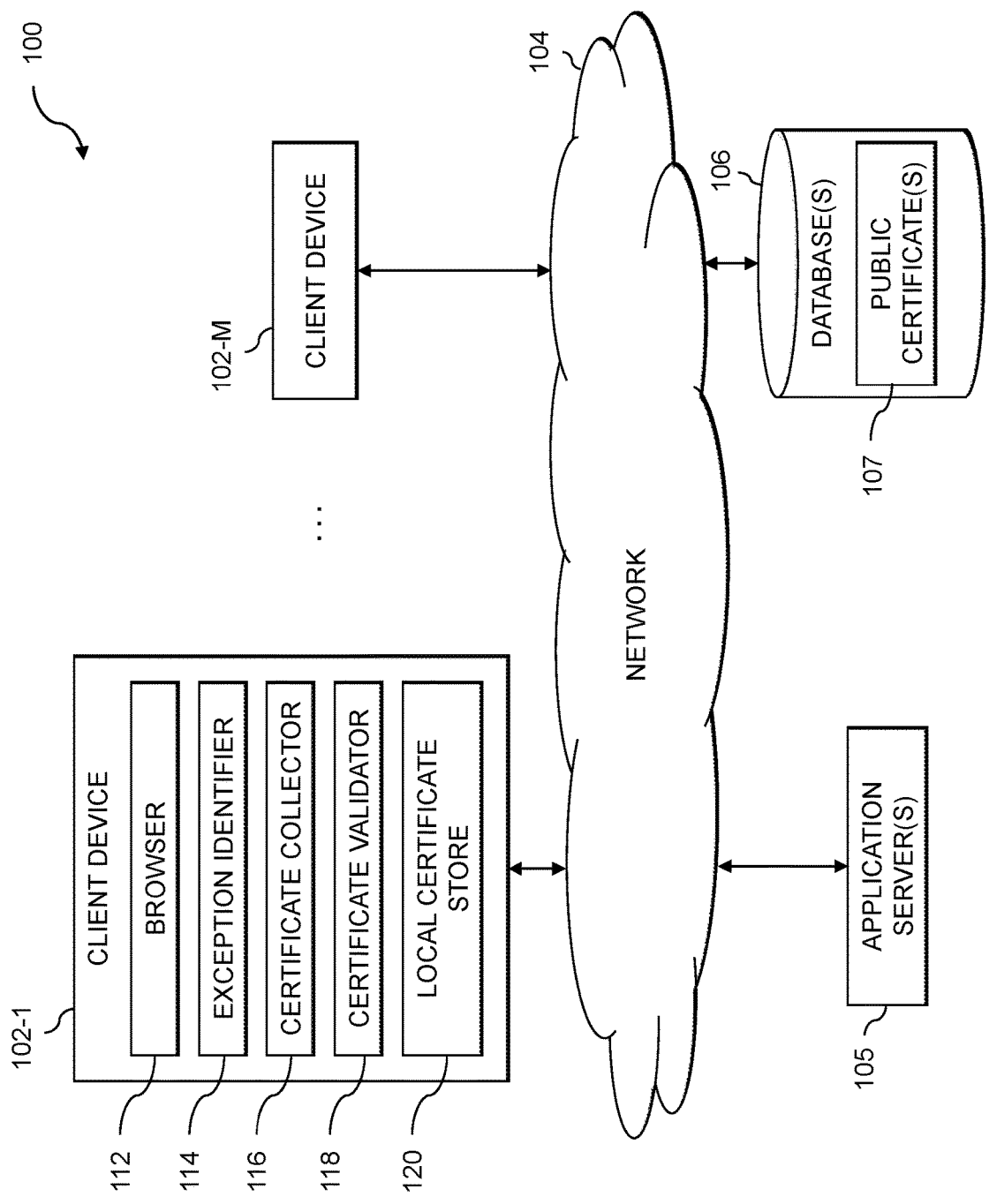
FIG. 1 shows an information processing system configured for automated security certificate techniques in an illustrative embodiment.

FIG. 1 shows a computer network (also referred to herein as an information processing system) 100 configured in accordance with an illustrative embodiment. The computer network 100 comprises a plurality of client devices 102-1, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 are one or more application servers 105.

The client devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the one or more application servers 105 can have at least one associated database 106 configured to store data pertaining to, for example, one or more public certificates 107.

An example database 106, such as depicted in the present embodiment, can be implemented using one or more storage systems associated with the one or more application servers 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the one or more application servers 105 and/or the client devices 102 are one or more input-output devices, which illustratively comprise keyboards, displays or other types of input-output devices in any combination. Such input-output devices can be used, for example, to support one or more user interfaces to the one or more application servers 105 and/or the client devices 102, as well as to support communication between the one or more application servers 105 and/or the client devices 102 and other related systems and devices not explicitly shown.

Additionally, the one or more application servers 105 and the client devices 102 in the FIG. 1 embodiment are each assumed to be implemented using at least one processing device. Each such processing device generally comprises at least one processor and an associated memory, and implements one or more functional modules for controlling certain features of the one or more application servers 105 and/or the client devices 102.

More particularly, the one or more application servers 105 and/or the client devices 102 in this embodiment can each comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interfaces allow communication between the one or more application servers 105 and the client devices 102, and each illustratively comprises one or more conventional transceivers.

In the FIG. 1 embodiment, the client device 102-1 comprises a browser 112, an exception identifier 114, a certificate collector 116, a certificate validator 118, and a local certificate store 120. It is to be appreciated that each of the other client devices 102 can be implemented in a similar manner as user device 102-1. It is to be appreciated that each of the other client devices 102 can be implemented in a similar manner as client device 102-1.

Generally, the browser 112 can comprise a web browser that enables a user to view web pages and other web-based content. The browser 112 can support a variety of technologies including hypertext markup language (HTML), cascading style sheets (CSS), JavaScript, Flash, and/or other technologies that enable interactive and/or multimedia features, as non-limiting examples. It is assumed that browser 112 includes functionality for enabling encrypted connections (e.g., with one or more of the application servers 105) using one or more security certificates. The term "security certificate" in this context and elsewhere herein is intended to be broadly construed so as to encompass a digital file that is used to authenticate an identity of a website and/or a server (such as a given one of application servers 105). Such security certificates also can enable an encrypted connection between two devices (e.g., between the client device 102-1 and at least one of the application servers 105).

The exception identifier 114 includes functionality for identifying one or more exceptions related to a handshake process (e.g., an SSL handshake process). The certificate collector 116 can collect one or more of the public certificates 107 based at least in part on the identified one or more exceptions. The certificate validator 118 validates the collected public certificates (e.g., against a certificate authority).

The local certificate store 120, in some embodiments, comprises a repository where private keys, certificates and/or symmetric keys can be stored. For example, the local certificate store 120 can be implemented as a file, a cryptographic token, a digital vault or using a mechanism of an operating system (OS) of the client device 102-1.

It is to be appreciated that this particular arrangement of elements 112, 114, 116, 118, and 120 illustrated in the client device 102-1 of the FIG. 1 embodiment is presented by way of example only, and alternative arrangements can be used in other embodiments. For example, the functionality associated with the elements 112, 114, 116, 118, and 120 in other embodiments can be combined into a single element, or separated across a larger number of elements. As another example, multiple distinct processors can be used to implement different ones of the elements 112, 114, 116, 118, and 120 or portions thereof.

At least portions of elements 112, 114, 116, 118, and 120 may be implemented at least in part in the form of software that is stored in memory and executed by a processor.

It is to be understood that the particular set of elements shown in FIG. 1 for the one or more application servers 105 involving client devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the one or more application servers 105 and database(s) 106 can be on and/or part of the same processing platform.

An exemplary process utilizing elements 112, 114, 116, 118, and 120 of an example client device 102-1 in computer network 100 will be described in more detail with reference to, for example, the flow diagrams of FIGS. 3 and 4.

Security certificates, including SSL certificates, can help protect users from having personal information stolen by malicious entities (e.g., hackers). For example, SSL certificates can be used to secure the connection between a web server and a web browser. SSL certificates do this by encrypting data that is transmitted between the two devices, which makes it difficult for anyone to intercept and read the data, even if they are able to eavesdrop on the connection.

It is noted that some embodiments are described herein with reference to SSL certificates, however, this is not intended to be limiting and such embodiments are also applicable to other types of security certificates. It is also noted that it is common in the art to use the term "SSL protocol" to refer to its successor protocol, namely, transport layer security (TLS) protocol. In this regard, the terms SSL, TLS, and SSL/TLS can be used interchangeably for the purposes of the present disclosure.

Generally, SSL certificates are issued by trusted third-party companies referred to as certificate authorities (CAs). CAs verify the identity of the website owner before issuing a digital certificate. Once the certificate is issued, it can be stored on the website's server. When a user visits the website, a browser of the user checks whether the certificate is valid and has not been tampered with. If the certificate is valid, then the browser will encrypt all data that is transmitted between the user device of the browser and the website's server.

In some instances, a web services provider that is securely certified can have several different certification levels. The corresponding certificates can be provided by a third-party trusted entity that is unknown to the client device and/or can be self-authored and self-signed. It is challenging to keep the certificates updated as it can often require an extensive manual process, which can introduce risks to the stability and health of the client application. Failures associated with certificates (e.g., during a web service handshake) can trigger errors and/or negatively impact user experience.

Conventional techniques for automating this process are generally based on a reactive process and rely on an external trigger to renew the client's security certificate. Additionally, such techniques often require manual changes to an OS and/or require that an external application agent is installed in order to renew certificates at the file system level, as may be the case for applications based on Java or .NET, for example. For example, an automated process can notify an agent that is installed on the client device to update a specific certificate at the OS level. Delegating the responsibility of maintaining security certificates of the client device to an external agent or a human intervention can reduce a service's availability and/or introduce security risks.

Some embodiments described herein provide automated techniques to identify when a client application (e.g., associated with a web service) needs a new security certificate or needs to renew an existing security certificate. Such techniques can also automatically create and/or update one or more security certificates of a service provider. In at least some embodiments, a given client device can automatically maintain and/or automatically recover from security certificate issues (e.g., issued during a handshake process). According to some embodiments, a client device can identify when there is a new or updated security certificate of a service provider, and proactively obtain the new or updated certificate. In at least some embodiments, the client device can independently update the security certificate at runtime without requiring any changes to the OS and without relying on external agents and/or triggers.

Figure 2:
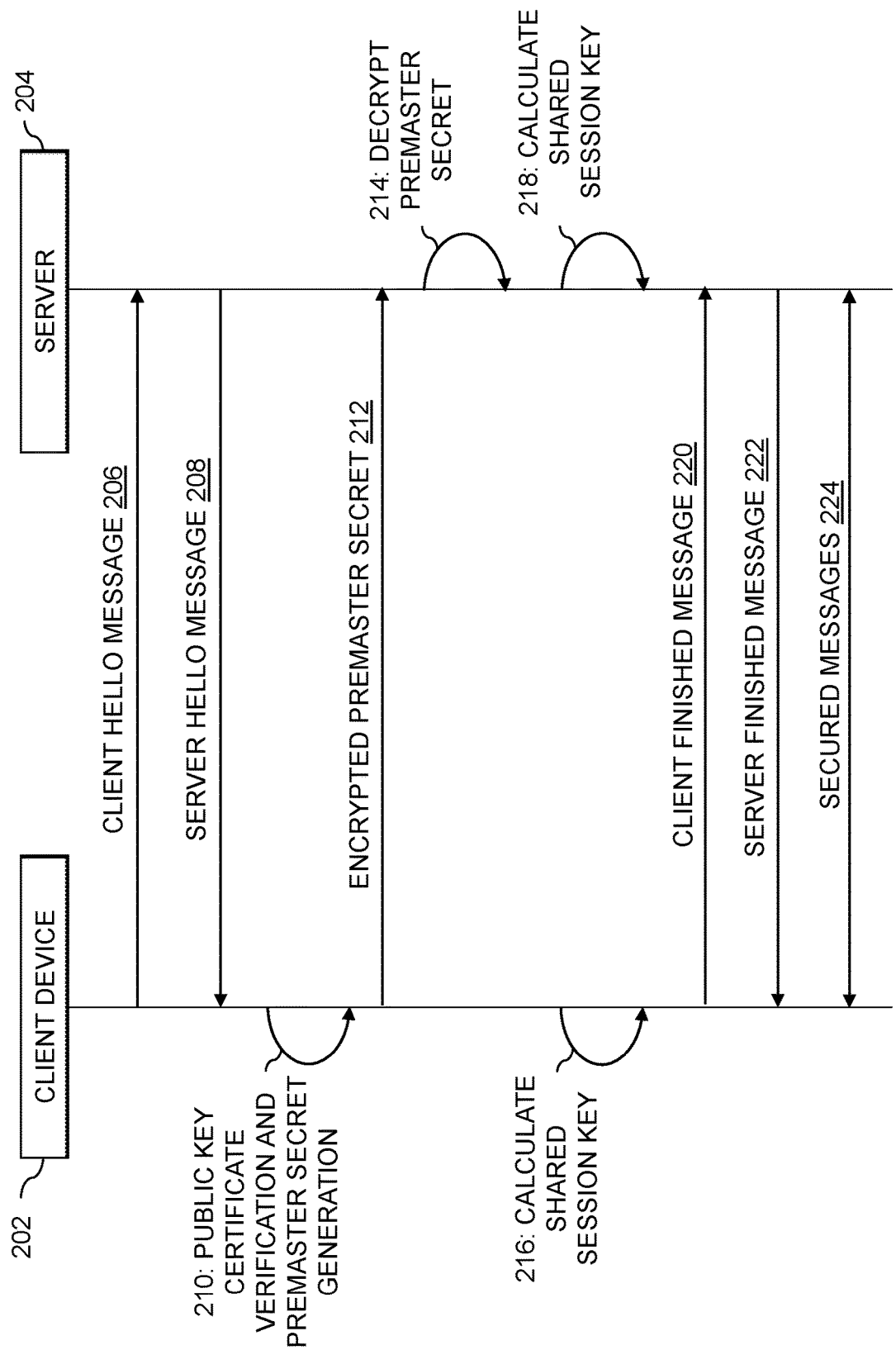
FIG. 2 shows a signaling diagram of a handshake process in an illustrative embodiment.

FIG. 2 shows a signaling diagram of a handshake process between a client device 202 and a server 204 in an illustrative embodiment.

The handshake process begins with the client device 202 sending a client hello message 206. In some embodiments, the client hello message 206 can include information identifying the client device 202, one or more cipher suites that it supports, one or more protocol versions (e.g., SSL/TLS), and random data (commonly referred to as the "client random").

The server 204 responds with a server hello message 208, which includes information that indicates one or more protocol versions chosen by the server 204 and the cipher suite, a public certificate, and random data (commonly referred to as the "server random"). The public certificate in the server hello message 208 includes a public key that can be used by the client device 202 to encrypt messages sent to the server 204.

The client device 202 performs a public key certificate verification in step 210, and then generates another random value (commonly referred to as the "premaster secret"). The client device 202 encrypts the premaster secret with the public key and sends the encrypted premaster secret 212 to the server 204.

The server 204 decrypts the encrypted premaster secret 212 with its private key in step 214. As a result, both the client device 202 and the server 204 have the client random, the server random, and the premaster secret. The client device 202 and server 204 then calculate a shared session key in steps 216 and 218, respectively.

The client device 202 sends a client finished message 220, which is encrypted with the shared session key.

The server 204 sends a server finished message 222, which is also encrypted with the shared session key.

If the client finished message 220 is properly decrypted and verified by the server 204, then it establishes that the client device 202 correctly calculated the session key. Similarly, if the server finished message 222 is properly decrypted and verified by the client device 202, then the client device 202 knows that the server 204 correctly calculated the shared session key. At this point, the handshake process is complete, and the client device 202 and the server 204 can exchange secured messages 224 with the shared session key.

The handshake process described in conjunction with FIG. 2 is presented by way of illustrative example only, and should not be construed as limiting the scope of the disclosure in any way. For example, in some embodiments, the server 204 can optionally request that the client device 202 authenticate itself. In such embodiments, the server 204 can request a client digital certificate (e.g., as part of the server hello message 208).

Accordingly, a server or web service provider generally exposes its public certificates as part of a given handshake process (such as the process depicted in FIG. 2). If an error occurs, then the server can reply with an exception that includes information indicating a type of error. According to at least some embodiments, a client device can leverage this information to automatically collect and update the client's keystore (e.g., local certificate store 120), as explained in more detail in conjunction with FIG. 3.

Figure 3:
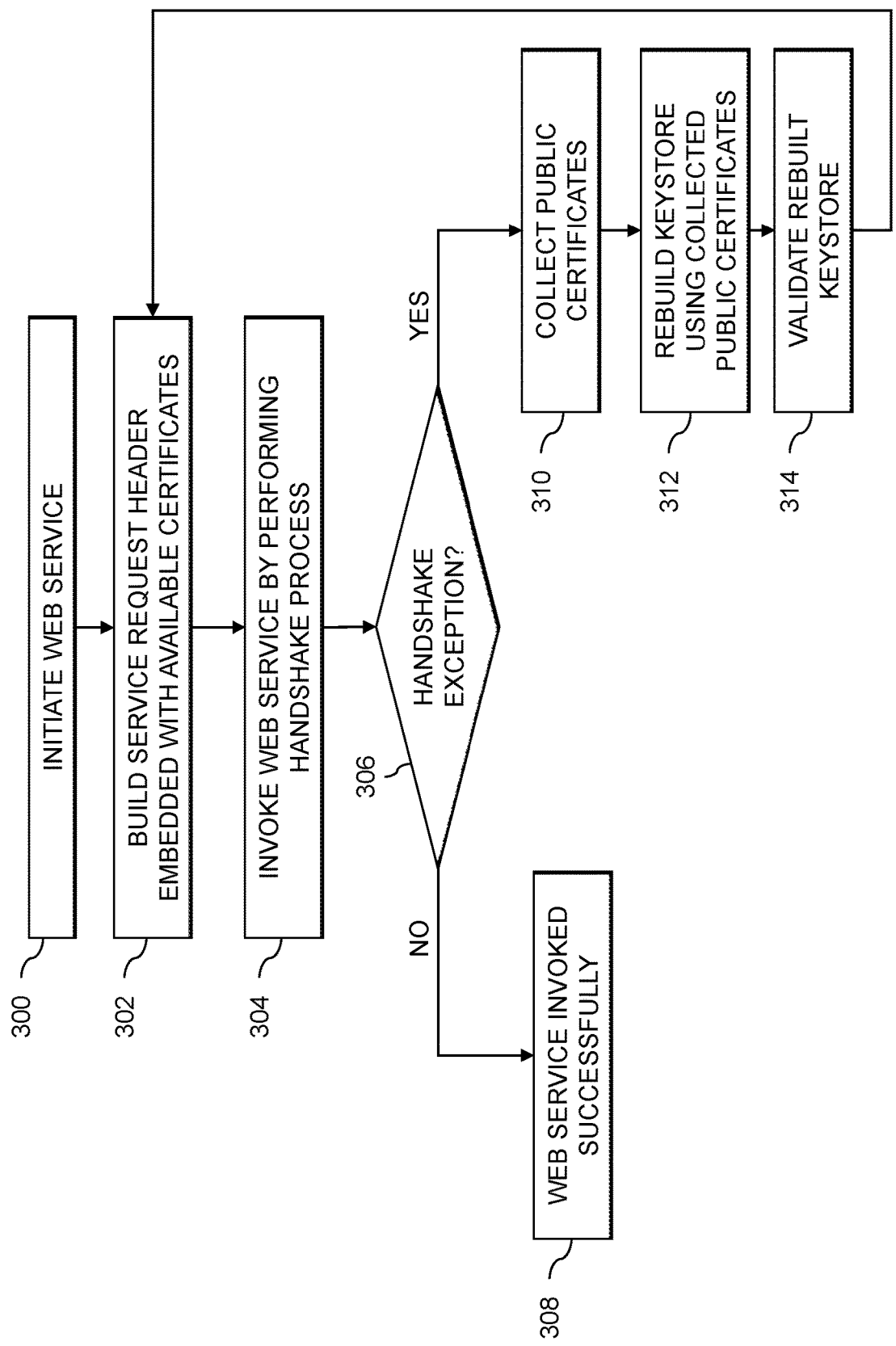
FIG. 3 shows a process flow diagram for maintaining digital certificates in an illustrative embodiment.

FIG. 3 shows a process flow diagram for maintaining digital certificates in an illustrative embodiment. It is to be understood that this particular process is only an example, and additional or alternative processes can be carried out in other embodiments. In this embodiment, the process includes steps 300 through 314.

Step 300 includes initiating a web service by a client device. The term "web service" as used herein is intended to be broadly construed so as to encompass any system (e.g., a software system) that supports interoperable machine-to-machine interaction over a network.

Step 302 includes building a service request header embedded with available certificates. For example, the client device can generate a service request and embed any certificates that are stored in the client device's keystore (e.g., local certificate store 120).

At step 304, the client device invokes the web service by performing a handshake process (such as the handshake process depicted in FIG. 2). The handshake process can be performed with a server corresponding to the web service.

Step 306 includes a test to detect whether a handshake exception occurred. If the result of step 306 is no, then the web service is successfully invoked as indicated by block 308.

If the result of step 306 is yes, then a handshake exception was detected, and the process continues to step 310. As a non-limiting example, the server can reply with an exception message (e.g., a javax.net.ssl.SSLHandshakeException message). The client device can be configured to detect these and other types of SSL handshake exception messages. A handshake exception can occur for a number of different reasons, such as: invoking the web service without the primary certificate (e.g., an SSL certificate) embedded in the service request header, invoking the web service with an outdated host certificate on the service request header, invoking the web service without a valid certificate on the host certificate authority chain path to the valid CA root certificate, and/or invoking the web service without a CA root certificate authored by the same certificate authority that authored the host certificate.

Step 310 includes collecting public certificates associated with the web service. As an example, if the client device attempts to access a resource at a uniform resource locator (URL) over an HTTPS protocol without a valid resource certificate corresponding to the resource and/or without a CA certificate that issued the resource certificate, then a handshake exception can occur. When that resource certificate is issued by a CA, the URL generally publicly exposes a certification path. As a non-limiting example, the certification path may include one or more of: the resource certificate, one or more intermediary certificates that issued the resource certificate, and root CA certificate. Accordingly, step 310 can collect the publicly exposed certificates based at least in part on the URL corresponding to the resource that the client device was attempting to access (e.g., by connecting to the corresponding server and collecting all available public certificates).

Step 312 includes rebuilding a keystore using the collected public certificates. For example, the client device can merge the collected public certificates with a local keystore, such as by replacing outdated versions of existing certificates and/or adding public certificates that were not previously included in the local keystore.

Step 314 includes validating the rebuilt keystore. For example, the rebuilt keystore can be validated and trusted by a locally installed CA or based on some external validation method. A non-limiting example of an external validation method can include automatically submitting at least some of the certificates in the rebuilt keystore to an external resource (e.g., a system and/or person) to ask whether or not the certificates should be trusted. In some embodiments, the previous keystore is kept until the rebuilt keystore is validated. Once validated, the rebuilt keystore can replace the previous keystore.

Following step 314, the process returns to step 302, so that the web service can be invoked using the rebuilt keystore.

Thus, in at least some embodiments, the process depicted in FIG. 3 enables the client device to automatically update the local keystore at runtime without needing an external agent or trigger.

Figure 4:
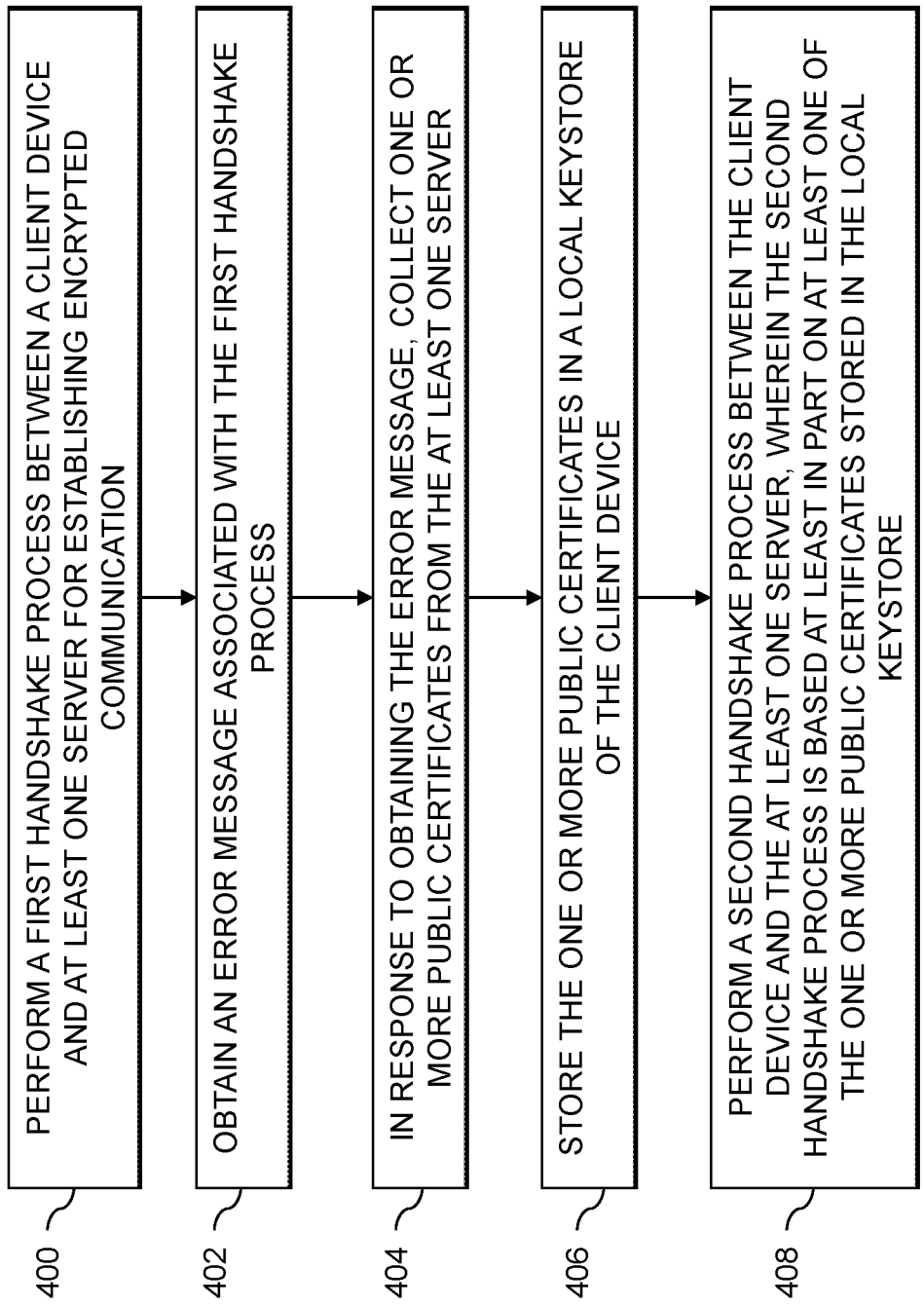
FIG. 4 shows a flow diagram of a process for automated security certificate techniques in an illustrative embodiment.

FIG. 4 is a flow diagram of an automated security certificate process in an illustrative embodiment. It is to be understood that this particular process is only an example, and additional or alternative processes can be carried out in other embodiments.

In this embodiment, the process includes steps 400 through 408. These steps are assumed to be performed by the client device 102-1 utilizing its elements 112, 114, 116, 118, and 120.

Step 400 includes performing a first handshake process between a client device and at least one server for establishing encrypted communication. Step 402 includes obtaining an error message associated with the first handshake process. Step 404 includes, in response to obtaining the error message, collecting one or more public certificates from the at least one server. Step 406 includes storing the one or more public certificates in a local keystore of the client device. Step 408 includes performing a second handshake process between the client device and the at least one server, wherein the second handshake process is based at least in part on at least one of the one or more public certificates stored in the local keystore.

The at least one of the first handshake process and the second handshake process may include at least one of an SSL protocol handshake process and a TLS protocol handshake process.

The storing may include generating the local keystore by merging the one or more public certificates with an existing local keystore of the client device. The one or more public certificates may include at least one of at least one public certificate that was not present in the existing local keystore and a newer version of at least one public certificate that was present in the existing local keystore.

The process may further include validating the local keystore using a locally installed certificate authority and an external validation process. As an example, the client device may send a request to an external entity (e.g., a person such as another user or a system administrator) to determine whether or not one or more of the public certificates should be trusted.

The error message may identify at least one of an invalid public certificate associated with the first handshake process, an expired public certificate associated with the first handshake process, and a missing public certificate associated with the first handshake process. For example, the error message can comprise an SSL handshake exception message, such as a javax.net.ssl.SSLHandshakeException message. The first handshake process may be associated with accessing at least one resource using a URL, and the collecting may be performed automatically by the client device based at least in part on the URL.

The process may further include transmitting one or more messages, to the at least one server, that are encrypted using a shared session key resulting from the second handshake process. For example, the messages can be transmitted via an HTTPS protocol using the shared session key, thereby creating an encrypted link between the server and the client device.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the efficiency of maintaining security certificates. These and other embodiments can effectively overcome problems associated with existing security ticket processing techniques that require one or more of: external triggers, external applications, and changes to an OS of client device. For example, some embodiments are configured to automatically update and/or add one or more security certificates at runtime without having to rely on operating system changes or software that is external to the client device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
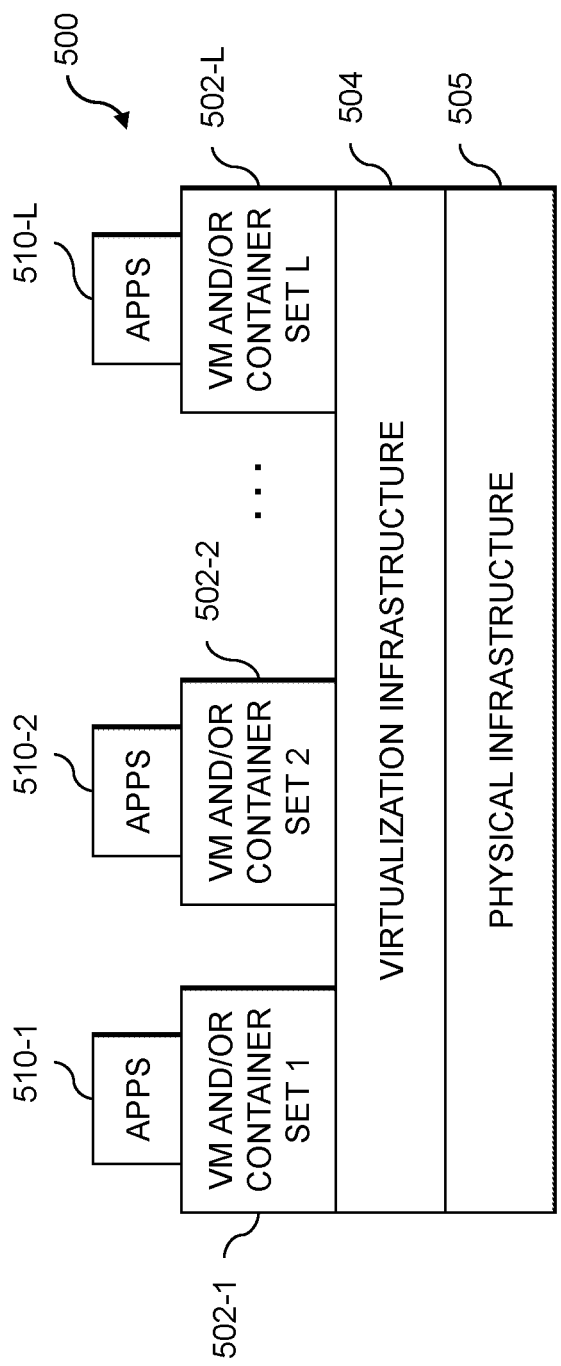
FIGS. 5 and 6 show examples of processing platforms that may be utilized to implement at least a portion of an information processing system in illustrative embodiments.
Figure 6:
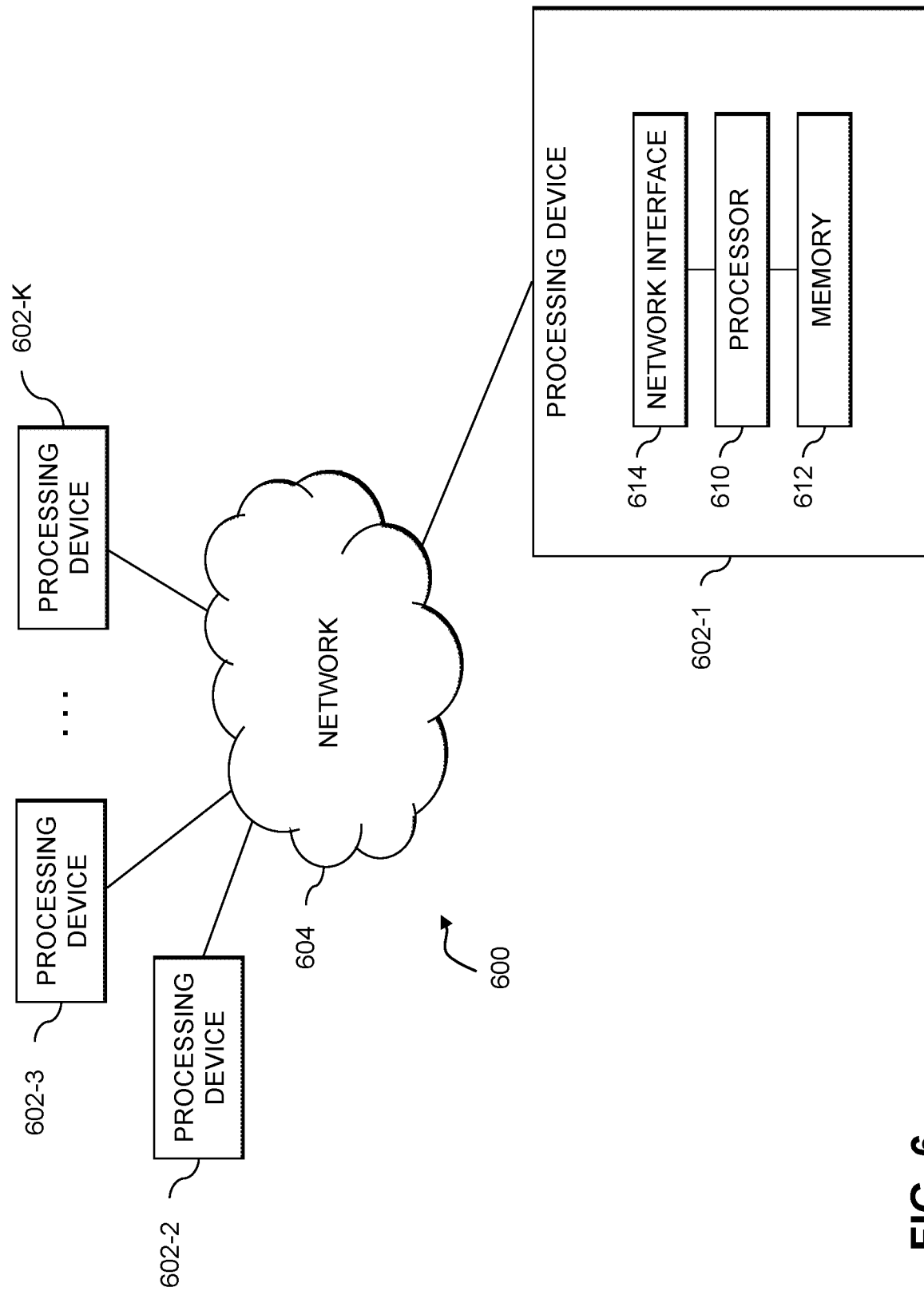

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an ASIC, an FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
performing a first handshake process between a client device and at least one server for establishing encrypted communication;
obtaining an error message associated with the first handshake process;
in response to obtaining the error message, collecting one or more public certificates from the at least one server;
storing the one or more public certificates in a local keystore of the client device; and
performing a second handshake process between the client device and the at least one server, wherein the second handshake process is based at least in part on at least one of the one or more public certificates stored in the local keystore;
wherein the method is performed by at least one processing device comprising a processor coupled to a memory.

2. The computer-implemented method of claim 1, wherein at least one of the first handshake process and the second handshake process comprise at least one of:
a secure sockets layer protocol handshake process; and
a transport layer security protocol handshake process.

3. The computer-implemented method of claim 1, wherein the storing comprises:
generating the local keystore by merging the one or more public certificates with an existing local keystore of the client device.

4. The computer-implemented method of claim 3, wherein the one or more public certificates comprise at least one of:
at least one public certificate that was not present in the existing local keystore; and
a newer version of at least one public certificate that was present in the existing local keystore.

5. The computer-implemented method of claim 1, further comprising:
  validating the local keystore using at least one of: a locally installed certificate authority and an external validation process.

6. The computer-implemented method of claim 1, wherein the error message identifies at least one of:
  an invalid public certificate associated with the first handshake process;
  an expired public certificate associated with the first handshake process; and
  a missing public certificate associated with the first handshake process.

7. The computer-implemented method of claim 1, wherein:
  the first handshake process is associated with accessing at least one resource using a uniform resource locator; and
  the collecting is performed automatically by the client device based at least in part on the uniform resource locator.

8. The computer-implemented method of claim 1, further comprising:
  transmitting one or more messages, to the at least one server, that are encrypted using a shared session key resulting from the second handshake process.

9. A non-transitory processor-readable storage medium having stored therein program code of one or more software programs, wherein the program code when executed by at least one processing device causes the at least one processing device:
  to perform a first handshake process between a client device and at least one server for establishing encrypted communication;
  to obtain an error message associated with the first handshake process;
  in response to obtaining the error message, to collect one or more public certificates from the at least one server;
  to store the one or more public certificates in a local keystore of the client device; and
  to perform a second handshake process between the client device and the at least one server, wherein the second handshake process is based at least in part on at least one of the one or more public certificates stored in the local keystore.

10. The non-transitory processor-readable storage medium of claim 9, wherein at least one of the first handshake process and the second handshake process comprise at least one of:
  a secure sockets layer protocol handshake process; and
  a transport layer security protocol handshake process.

11. The non-transitory processor-readable storage medium of claim 9, wherein the storing comprises:
  generating the local keystore by merging the one or more public certificates with an existing local keystore of the client device.

12. The non-transitory processor-readable storage medium of claim 11, wherein the one or more public certificates comprise at least one of:
  at least one public certificate that was not present in the existing local keystore; and
  a newer version of at least one public certificate that was present in the existing local keystore.

13. The non-transitory processor-readable storage medium of claim 9, wherein the program code further causes the at least one processing device:
  to validate the local keystore using at least one of: a locally installed certificate authority and an external validation process.

14. The non-transitory processor-readable storage medium of claim 9, wherein the error message identifies at least one of:
  an invalid public certificate associated with the first handshake process;
  an expired public certificate associated with the first handshake process; and
  a missing public certificate associated with the first handshake process.

15. The non-transitory processor-readable storage medium of claim 9, wherein:
  the first handshake process is associated with accessing at least one resource using a uniform resource locator; and
  the collecting is performed automatically by the client device based at least in part on the uniform resource locator.

16. An apparatus comprising:
  at least one processing device comprising a processor coupled to a memory;
  the at least one processing device being configured:
  to perform a first handshake process between a client device and at least one server for establishing encrypted communication;
  to obtain an error message associated with the first handshake process;
  in response to obtaining the error message, to collect one or more public certificates from the at least one server;
  to store the one or more public certificates in a local keystore of the client device; and
  to perform a second handshake process between the client device and the at least one server, wherein the second handshake process is based at least in part on at least one of the one or more public certificates stored in the local keystore.

17. The apparatus of claim 16, wherein at least one of the first handshake process and the second handshake process comprise at least one of:
  a secure sockets layer protocol handshake process; and
  a transport layer security protocol handshake process.

18. The apparatus of claim 16, wherein the storing comprises:
  generating the local keystore by merging the one or more public certificates with an existing local keystore of the client device.

19. The apparatus of claim 18, wherein the one or more public certificates comprise at least one of:
  at least one public certificate that was not present in the existing local keystore; and
  a newer version of at least one public certificate that was present in the existing local keystore.

20. The apparatus of claim 16, wherein the at least one processing device is further configured:
  to validate the local keystore using at least one of: a locally installed certificate authority and an external validation process.

* * * * *